R. W. SMITH.
ANTIVIBRATION HANDLE BAR FOR MOTORCYCLES, CYCLES, AND THE LIKE.
APPLICATION FILED JUNE 30, 1920.
1,398,447. Patented Nov. 29, 1921.
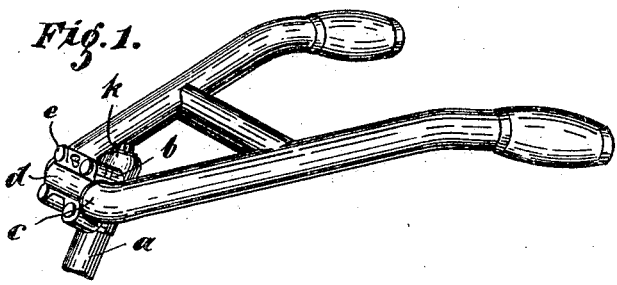
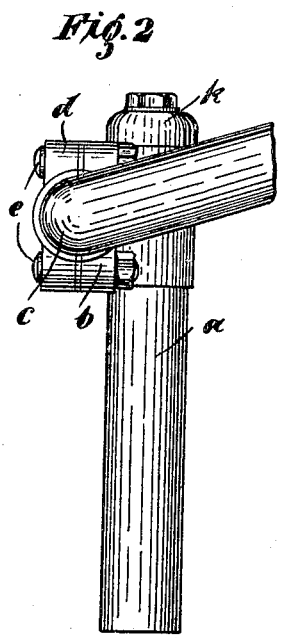 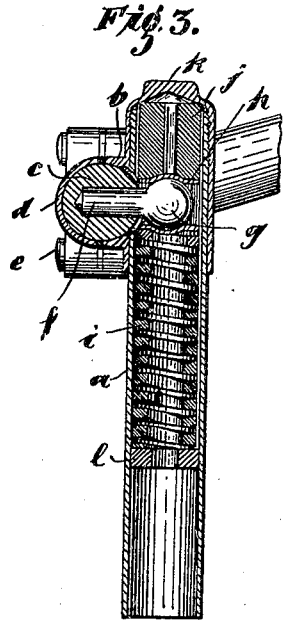

UNITED STATES PATENT OFFICE.

ROBERT WALKER SMITH, OF REDDITCH, ENGLAND.

ANTIVIBRATION HANDLE-BAR FOR MOTORCYCLES, CYCLES, AND THE LIKE.

1,398,447.  Specification of Letters Patent.  Patented Nov. 29, 1921.

Application filed June 30, 1920. Serial No. 393,157.

(GRANTED UNDER THE PROVISIONS OF THE ACT OF MARCH 3, 1921, 41 STAT. L., 1313.)

*To all whom it may concern:*

Be it known that I, ROBERT WALKER SMITH, a subject of the Kingdom of Great Britain, residing at Enfield Works, Redditch, in the county of Worcester, England, director of The Enfield Cycle Company, Limited, have invented a new or Improved Antivibration Handle-Bar for Motorcycles, Cycles, and the like, (for which I have filed applications in France, Patent No. 512,463, dated 27th March, 1920; Switzerland, Patent No. 87,689, dated April 1, 1920; Spain, Patent No. 73,888, dated August 31, 1920; Portugal, Patent No. 11,584, dated April 26, 1921; Canada, Patent No. 211,857, dated May 24, 1921, and South Africa, Patent No. 1,197, dated November 1, 1920,) of which the following is a specification.

This invention relates to anti-vibration handlebars for cycles, in which the handlebar proper is adapted to rotate in a hollow boss secured to and disposed in front of the upper part of the handlebar stem, the handlebar being furnished with a rearwardly projecting arm or member which extends into the interior of the handlebar stem and coöperates with a coiled spring disposed below such arm and a rubber buffer disposed above the arm. According to the present invention, the hollow boss aforesaid is formed in two halves, one half being permanently combined with the handlebar stem, and having a semi-circular bearing for the handlebar proper, the other half being a separable member having a semi-circular bearing and being adapted to be secured in appropriate relationship to the first half by bolts or other suitable means. The rearwardly projecting arm or member may have a rounded enlargement at its rear extremity adapted to coöperate with central depressions provided in washers disposed above and below such enlargement, and between the latter and the rubber cushion and coiled spring.

It is not broadly new in connection with anti-vibration handlebars to rotatably mount the handlebar in a socket formed in two halves, and I therefore wish it to be understood that my invention lies in the combination of features and characteristics which I have enumerated, and which are set out in the claims hereinafter appearing.

In order that this invention may be clearly understood and readily carried into practice, reference may be had to the appended explanatory sheet of drawings, upon which:—

Figure 1 is a perspective view of a handle-bar constructed according to the present invention.

Fig. 2 is a side elevation of the handle bar shown in Fig. 1.

Fig. 3 is a sectional side elevation of the handle bar shown in Figs. 1 and 2.

In a convenient embodiment of the present invention the tubular stem $a$ of the handle bar is of even diameter throughout its length, that is to say, it is of the same diameter at its upper part as at its lower part, but around the upper part of the stem a bracket $b$ is suitably fixed either permanently or detachably, the said bracket being advantageously adapted to embrace the tube and being furthermore adapted to form a bearing for the transverse part $c$ of the handle bar tube, which latter is assembled within a semi-circular concave part or bearing in the bracket and retained therein by a separable part $d$ of the bracket, also having a semi-circular or concave bearing part and which may be attached to the main part of the bracket by bolts $e$ or other suitable means. Ball or other anti-friction bearings may or may not be incorporated in connection with the bearing of the transverse part of the bar within its carrier bracket. At a central point in the transverse part of the handle bar the tube of the latter is furnished with a suitable filling or plug, which filling or plug provides for the screwing or attachment of the rearwardly extending arm $f$, which may have a rounded enlargement $g$ at its rear extremity. Immediately above and immediately below the said enlarged rear extremity of the arm, washers or plates $h$ are incorporated which may have slight central depressions adapted to coöperate with portions of the enlargement $g$, and the said plates occur between the arm and the spring $i$ on the one hand and the rubber cushion $j$ on the other hand, so that upon depression of the handle bar the spring $i$ is depressed, while the presence of the rubber buffer $j$ counteracts shocks or concussions occurring as a result of rebound efforts occurring after the anti-vibration spring has contracted in its absorption of a shock or vibration.

The cap $k$ at the upper extremity of the stem *a* may be furnished with hexagonal or other suitable formations permitting of its being removed by a spanner or other implement. The stem is furnished with a suitable hole at the front to accommodate the rearwardly extending arm of the handle bar, and the stop or support *l* for the coiled spring *i* which is disposed at the lower end of the latter may be suitably fixed or secured within the carrier tube at an appropriate point therein.

If desired provision may be incorporated for adjusting the position of the stop *l* in a longitudinal direction in relation to the stem *a*, for the purpose of increasing or decreasing the effort of the coiled spring which is disposed below the rearwardly projecting arm of the handle bar.

What I claim as my invention, and desire to secure by Letters Patent is:—

1. An anti-vibration handlebar for motor cycles, cycles and the like, having the handle bar proper mounted to rotate in a hollow boss secured to and disposed in front of the upper part of the handlebar stem, the handlebar being furnished with a rearwardly projecting arm or member which extends into the interior of the handlebar stem and coöperates with a spring disposed below such arm and a rubber buffer disposed above the arm, and in which the hollow boss aforesaid is formed in two halves, one half being permanently combined with the handlebar stem and having a semi-circular bearing for the handlebar proper, and the other half being a separable member having a semi-circular bearing and being adapted to be secured in appropriate relationship to the first half by bolts or other suitable means, substantially as set forth and illustrated.

2. An anti-vibration handlebar as claimed in the first claim, and in which the rearwardly projecting arm or member has a rounded enlargement at its rear extremity adapted to coöperate with central depressions provided in washers disposed above and below such enlargement and between the latter and the rubber cushion and coiled spring, substantially as set forth.

In witness whereof I have hereunto set my hand.

ROBERT WALKER SMITH.